US009817404B1

(12) United States Patent
Loo et al.

(10) Patent No.: US 9,817,404 B1
(45) Date of Patent: Nov. 14, 2017

(54) CARAVAN MANAGEMENT

(71) Applicant: Allstate Insurance Company, Northbrook, IL (US)

(72) Inventors: William Loo, Arlington Heights, IL (US); Jennifer A. Brandmaier, Chicago, IL (US); Philip Peter Ramirez, Arlington Heights, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 14/826,581

(22) Filed: Aug. 14, 2015

Related U.S. Application Data

(63) Continuation of application No. 14/055,198, filed on Oct. 16, 2013, now Pat. No. 9,141,112.

(51) Int. Cl.
*G05D 1/02* (2006.01)
*G01C 21/28* (2006.01)

(52) U.S. Cl.
CPC .......... *G05D 1/0293* (2013.01); *G01C 21/28* (2013.01); *G05D 1/0295* (2013.01)

(58) Field of Classification Search
CPC ................................................... G01C 21/28
See application file for complete search history.

(56) References Cited

U.S. PATENT DOCUMENTS

| 7,286,825 | B2 | 10/2007 | Shishido et al. |
| 8,139,109 | B2 | 3/2012 | Schmiedel et al. |
| 8,332,242 | B1 | 12/2012 | Medina, III |
| 8,458,315 | B2 | 6/2013 | Miche et al. |
| 2006/0161341 | A1* | 7/2006 | Haegebarth ............. G08G 1/20 |
| | | | 701/117 |
| 2007/0268158 | A1 | 11/2007 | Gunderson et al. |
| 2008/0059007 | A1 | 3/2008 | Whittaker et al. |

(Continued)

FOREIGN PATENT DOCUMENTS

| JP | H-10293899 | * 11/1998 |
| WO | 94/11853 A1 | 5/1994 |

(Continued)

OTHER PUBLICATIONS

"Dodge Grand Caravan Car Insurance"; http://www.allstate.com/auto-insurance/cars-trucks/Dodge/Grand-Caravan-car-insurance.aspx (last visited Oct. 17, 2013).

(Continued)

*Primary Examiner* — Aaron L Troost
(74) *Attorney, Agent, or Firm* — Banner & Witcoff, Ltd.

(57) ABSTRACT

Methods, computer-readable media, software, and apparatuses provide a system for forming and managing a caravan of vehicles. The system may include computing devices in a plurality of vehicles belonging to a caravan. The computing devices participating in the caravan may communicate various information to each other. This information may be used to generate and manage a route for the caravan. The system may also be used to select a leader and/or order of the caravan for a particular trip. During the trip, the system may monitor the caravan and analyze inputs from participants and vehicles. Further, the system may modify the route based on such inputs and distribute the modified route to participating computing devices so that the caravan may be maintained.

19 Claims, 5 Drawing Sheets

(56) References Cited

U.S. PATENT DOCUMENTS

| | | | |
|---|---|---|---|
| 2009/0024419 A1 | 1/2009 | McClellan et al. | |
| 2009/0210257 A1 | 8/2009 | Chalfant et al. | |
| 2009/0254241 A1 | 10/2009 | Basir | |
| 2010/0030586 A1* | 2/2010 | Taylor | G06Q 40/08 705/4 |
| 2010/0131300 A1 | 5/2010 | Collopy et al. | |
| 2010/0205012 A1 | 8/2010 | McClellan | |
| 2010/0256852 A1* | 10/2010 | Mudalige | G08G 1/22 701/24 |
| 2011/0137687 A1 | 6/2011 | Duddle et al. | |
| 2013/0041547 A1 | 2/2013 | Goodermuth et al. | |
| 2013/0046559 A1 | 2/2013 | Coleman et al. | |
| 2013/0151288 A1 | 6/2013 | Bowne et al. | |
| 2013/0166324 A1 | 6/2013 | Lally | |
| 2014/0005941 A1 | 1/2014 | Paek et al. | |
| 2014/0012501 A1* | 1/2014 | Hahne | G01C 21/34 701/533 |
| 2014/0282093 A1 | 9/2014 | Burke et al. | |
| 2014/0316865 A1* | 10/2014 | Okamoto | G08G 1/22 705/14.1 |

FOREIGN PATENT DOCUMENTS

| | | | | |
|---|---|---|---|---|
| WO | 2006131929 A2 | 12/2006 | | |
| WO | WO 2012105889 A1 * | 8/2012 | | G05D 1/0293 |

OTHER PUBLICATIONS

"Vehicle Safety Communications in the United States"; http://www-nrd.nhtsa.dot.gov/pdf/esv/esv20/07-0010-O.pdf (last visited Oct. 17, 2013).

"How much would car insurance cost for a Dodge Caravan"; http://www.carinsurancecomparison.com/how-much-would-car-insurance-cost-for-a-dodge-caravan/ (last visited Oct. 17, 2013).

Vlad Coroama et al., "Personalized Vehicle Insurance Rates"; "A Case for Client-side Peronalization in Ubiquitous Computing"; Institute for Pervasive Computing; ETH Zurich; http://www.vs.infethz.ch/publ/papers/coroama-langheinrich_2006_client-side-pers.pdf (last visited Oct. 17, 2013).

Vincent Baines et al., "Communication and metrics in agent convoy organization"; Dept. of Computer Science, University of Bath; pp. 1-9; {v.f.baines,j.A.padget}@bath.ac.uk.

A European project invents a self driven car convoy; Cleantech Republic; http://www.cleantechrepublic.net/2011/07/07/a-european-project-invents-a-self-driven-car-convoy/.

Yuichi Shiraki et al., "Developoment of an Inter-Vehicle Communications Systems"; OKI Technical Review 187; Sep. 2001; vol. 68, pp. 11-13.

Non Final Office Action dated Dec. 1, 2014 in U.S. Appl. No. 14/055,198.

Notice of Allowance dated Jun. 8, 2015 in U.S. Appl. No. 14/055,198.

* cited by examiner

500

Welcome back Amy.

Select Caravan To Join/Review

Available Caravans:

- Rob's Baseball Team    (Join)    (History)

- Sandy's Girl Scout Troop    (Join)    (History)

- Tommy's Basketball Team    (Join)    (History)

Click here to create a new caravan

A caravan is waiting for you to join: click here

Hi Amy!

Survey

Available Restaurants:    Enter Ranking:

- McDonald's    ☐

- Wendy's    ☐

- KFC    ☐

FIG. 5B

CARAVAN MANAGEMENT

CROSS-REFERENCE TO RELATED APPLICATIONS

This application is a continuation of and claims priority to U.S. patent application Ser. No. 14/055,198, filed on Oct. 16, 2013 and entitled "Caravan Management," which is hereby incorporated by reference herein in its entirety.

FIELD OF ART

Aspects of the disclosure generally relate to methods and computer systems, including one or more computers particularly configured and/or executing computer software. More particularly, aspects of this disclosure provide a system for forming and managing vehicles in a caravan.

BACKGROUND

At times, a group of individuals may choose to travel together in multiple vehicles. This group of vehicles is sometimes referred to as a caravan. Caravans may be formed for a variety of reasons. In one known example, parents of children on a youth sports team (e.g., baseball team, soccer team, etc.) may form a caravan when driving their respective vehicles to a game. In this case, one parent may be chosen to lead the caravan and the other vehicles simply follow the lead vehicle. The following vehicles might not have any control over the route the lead vehicle takes. Therefore, if the lead vehicle gets lost or takes a longer (or more inefficient) route, following vehicles may suffer the same fate, get separated from the caravan, or opt to leave the caravan. Moreover, if a passenger in a following vehicle wants to stop, he or she may communicate with others in the caravan by individually calling or texting the mobile phones of others (assuming they have the mobile phone numbers of others) to inform them of the desire to stop. Otherwise, a following vehicle may choose to stop and risk losing the rest of the vehicles in the caravan.

The more vehicles and/or passengers in the caravan, the greater the difficulty in organizing the trip to meet the group's desires. Also, desires may change during a trip and it may be difficult to modify the route of the caravan to meet the changing desires. Other factors, such as traffic, traffic lights, weather, road conditions, destination changes, etc., can also make it difficult to successfully carry-out a caravan. Caravans can be particularly difficult to maintain when a destination is not set prior to departure. For example, a group of motorcyclists (or cyclists) on a joy ride might not have chosen a destination and followers may be frustrated with their limited control over the route being taken.

Accordingly, new systems, devices, methodologies, and software are desired to facilitate formation and coordination of a group of vehicles in a caravan and sharing of information between vehicles of a caravan during a trip.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for providing a caravan management system that facilitates grouping of vehicles to form a caravan and generating a route based on data obtained from different vehicles or from individuals in different vehicles. The system also monitors the caravan and manages the sharing of information among vehicles in the caravan during a trip. The system may allow vehicle devices and/or passenger devices to modify a route based on various information to coordinate a trip to meet (or consider) the desires and abilities of those participating in the caravan. The system may also share information to assist in keeping the caravan together. For example, information that one or more vehicles are lagging behind may be shared with the lead vehicle and/or other vehicles (or computing devices therein). Such information may include suggestions for modifying the route or order of vehicles within the caravan to keep the caravan together. In sum, one or more of the features of the system may provide an improved experience for participants in the caravan.

Aspects of this disclosure provide a system comprising a first computing device in the first vehicle and a second computing device in the second vehicle. The first and second computing devices may be any one of a driver computing device (e.g., smartphone, tablet, etc.), a passenger computing device (e.g., smartphone, tablet, etc.), or a vehicle computing device installed in a vehicle. The first and second computing devices may be configured to communicate with each other as well as any other computing devices participating in the caravan. The system may also include a third computing device, which may be any computing device participating in the caravan and/or a computing device or server connected to a participating computing device via a network (e.g., the Internet). The third computing device may be configured to receive first information from the first computing device, and second information from the second computing device. Moreover, the third computing device may be configured to generate a route based on the first information and the second information, and/or relay the first and second information between first and second computing devices. The first and second information may include user preferences of various users participating in the caravan. Additionally, or alternatively, the first and second information may include information regarding the abilities of vehicles and/or drivers of such vehicles participating in the caravan.

Aspects of the disclosure also provide the computing devices of the system as well as the computer readable media of those computing devices that store a caravan management program. Specifically, aspects of the disclosure provide a computing device, comprising a network interface configured to communicate with one or more second computing devices; a user interface module configured to receive input from a user in a first vehicle; and a processor. The processor may be configured to associate the first vehicle with one or more second vehicles to form a group of vehicles; collect first information from the user in the first vehicle; collect, from at least one of the one or more second computing devices, second information related to at least one passenger in at least one of the one or more second vehicles of the group; and determine a route based on the first information and the second information. In some examples, the processor may access, read, and write data to a particular memory device. The memory device may store computer-executable instructions of a caravan management program.

Aspects of the disclosure further provide a method of forming and managing a caravan. The method may include configuring a plurality of computing devices with a caravan manager. Such configuring may include downloading and installing a caravan management program from a caravan management service provider. The method may further include steps of associating, by one of the computing devices, a group of vehicles in a caravan, and generating a route for the caravan. Generating the route may be based on information obtained from individuals within two or more of the vehicles. For example, the route may be generated based on a user preference of a user in a leading vehicle to eat lunch at a first establishment and another user preference of another user in a trailing vehicle to eat lunch at a second establishment. The preferences may be evaluated and potential routes may be explored to determine whether one or more routes are available within a certain distance from one of the two establishments. When a route is generated, it may be transmitted to at least one of the computing devices in each of the vehicles in the caravan.

In some aspects, the method may further include steps of identifying, by one of the computing devices, at least two of the drivers of each of the vehicles in the caravan; selecting one of the identified drives as a leader; and transmitting a suggestion to at least two of the computing devices, the suggestion indicating the leader. In other aspects, the method may further include receiving, by one of the computing devices, at least one of user information and vehicle information. The user information may indicate a desire of a participant of the caravan (e.g., to make a pit stop), while the vehicle information may indicate a condition of a vehicle (e.g., low tire pressure). The route may then be modified based on such information, and the modified route may be transmitted to at least one of the computing devices in each of the vehicles in the caravan.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited in the accompanying figures in which like reference numerals indicate similar elements and in which:

FIGS. 5A and 5B illustrate high-level diagrams of example interfaces presented by computers configured according to aspects of the present disclosure.

DETAILED DESCRIPTION

In accordance with various aspects of the disclosure, methods, computer-readable media, software, and apparatuses are disclosed that provide a caravan management system for grouping vehicles to form a caravan. The caravan management system may facilitate the exchange of information between vehicles in the caravan. This information may be used to determine an initial route for a trip that each of the vehicles in the caravan is expected to take. The information may also be exchanged during the trip so that the route may be modified. For example, participants in the caravan may vote on where to stop for lunch so that the route is modified to stop for lunch at a place according to the desires of the group as a whole.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made. Furthermore, the disclosure of the following patent application is incorporated by reference herein in its entirety: U.S. patent application Ser. No. 13/216,849, filed Aug. 24, 2011, entitled "In Vehicle Driver Feedback Device."

Figure 1:
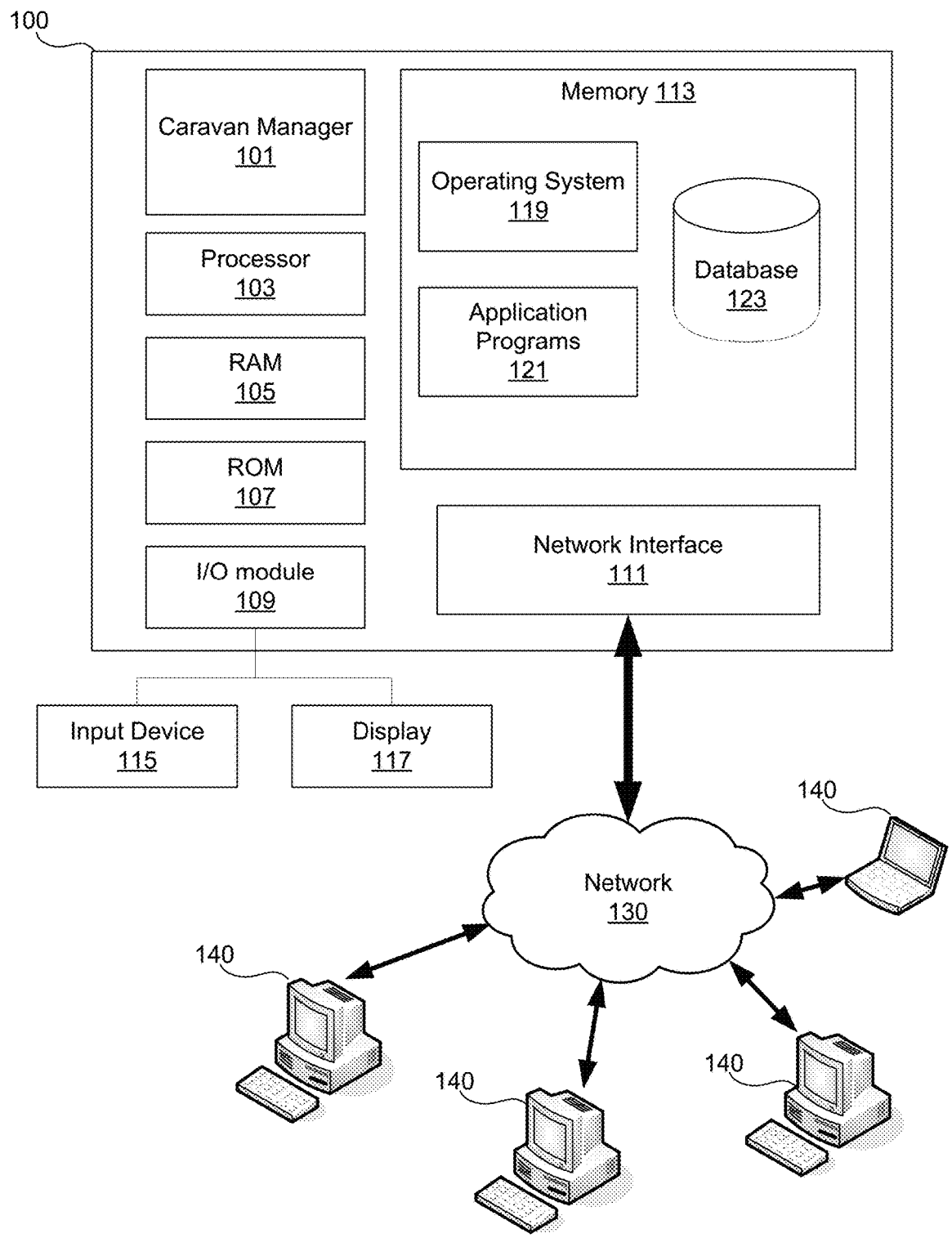
FIG. 1 is a block diagram of an example computing device that may be used according to an illustrative embodiment of the present disclosure.

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a caravan manager 101 for performing methods and executing instructions of the caravan management program described herein. The caravan manager 101 may be implemented with one or more processors and one or more storage units (e.g., databases, RAM, ROM, and other computer-readable media), one or more application specific integrated circuits (ASICs), and/or other hardware components. Throughout this disclosure, the caravan manager 101 may refer to the software and/or hardware used to implement the caravan manager 101. The one or more processors of the caravan manager 101 may operate in addition to or in conjunction with another general processor 103 of the computing device 100. Both the caravan manager 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of the caravan management program, such as rules for generating a route, selecting a leader of the caravan, and determining whether to modify the route, described in further detail below. On some computing devices 100, the input device 115 may be operated by users to interact with the caravan management program, including providing user information and/or preferences, voting for a leader, entering information for generating or modifying a route, etc., as described in further detail below. Meanwhile, the display device 117 may assist the system administrators and users to confirm/appreciate their inputs.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet. Through the network 130, the computing device 100 may communicate with one or more computing devices 140, such as laptops, notebooks, smartphones, personal computers, servers, etc. The computing devices 140 may also be configured in the same manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

FIG. 1 is an example embodiment of a computing device 100. In other embodiments, the computing device 100 may include fewer or more elements. For example, the computing device 100 might not include the processor 103 in addition to one or more processors of the caravan manager 101. On the other hand, the computing device 100 may be a mobile device (e.g., a smartphone, tablet, etc.), and thus, may also include various other components, such as a battery, speaker, and/or antennas (not shown). Also, the computing device 100 may be a vehicle computing device 100 (either installed by a vehicle manufacturer or as an aftermarket part) having vehicle compatible elements, such as a port for an on-board diagnostic connector or ports for other vehicle sensors (e.g., tire pressure sensors, engine temperature sensors, etc.).

Figure 2:
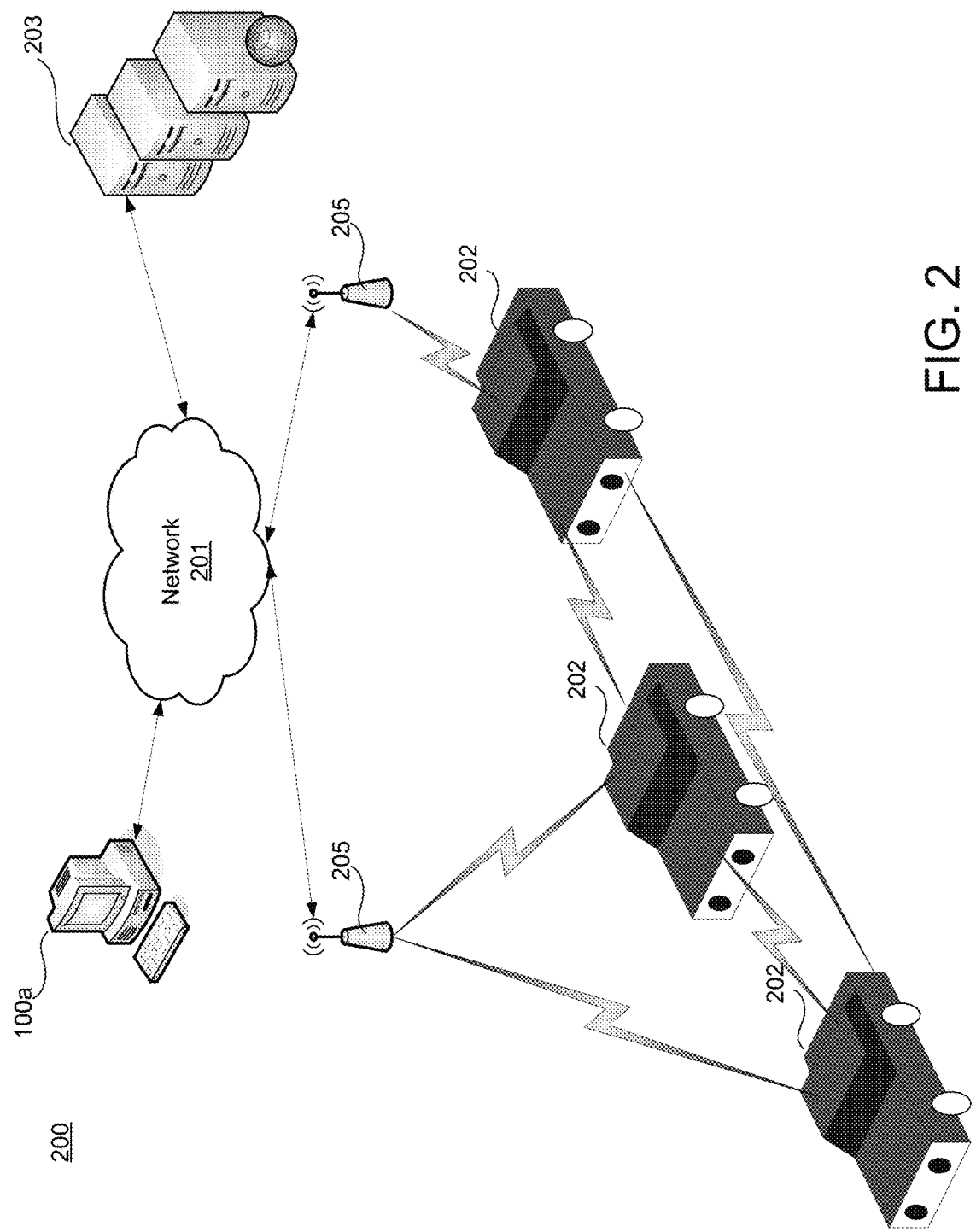
FIG. 2 illustrates an example network environment in which a system in accordance with the present disclosure may be implemented.

The methods and software for managing a caravan disclosed herein may be implemented on one or more computing devices 100 used in various network environments. FIG. 2 illustrates an example network environment 200 for implementing methods according to the present disclosure. As shown in FIG. 2, the network environment 200 may include a network 201 configured to connect computing devices (not shown in FIG. 2) within vehicles 202, one or more administrative computing devices 100a, and one or more application servers 203. Collectively, these computing devices may form a caravan management system. The network 201 may be any type of network, like the network 130 described above, and use one or more communication protocols (e.g., protocols for Bluetooth, cellular communications, satellite communications, etc.) to connect computing devices and servers within the network environment. In particular, the network 201 may include a cellular network and its components, such as base stations, cell towers, etc. The network environment 200 may include access points 205 to extend the network 201 to reach mobile computing devices, such as personal smartphones and vehicle computing devices. The access points 205 may include cellular network components (e.g., cell towers, base stations, etc.), global positions system components (e.g., antennas, satellites, etc.), and other wireless access components (e.g., routers). As shown in FIG. 2, the access points may allow computing devices within vehicles 202 to communicate with the one or more administrative computing devices 100a, application servers 203, and computing devices within other vehicles 202. As such, through the network 201, the computing devices within the vehicles 202 may obtain a variety of information, including map data, traffic information, weather information, construction information (e.g., roadwork information), vendor information (e.g., names of nearby gas stations, their locations, their gas prices, whether they have a restroom, whether they have a store, and the like), etc. While the disclosure may focus on connecting the computing devices within vehicles 202 to the network 201, it should be understood that these same computing devices may connect to the network 201 even if they are removed from the vehicles 202.

Additionally, FIG. 2 illustrates a group of vehicles 202 in a caravan. Although FIG. 2 shows each of the vehicles 202 as being a car, the vehicles 202 may be a motorcycle, bicycle, scooter, drone (or other automated device), truck, bus, boat, plane, etc. Further, the caravan may include any combination of the various types of vehicles (e.g., a car and a motorcycle may form a caravan). While three vehicles 202 are specifically shown in FIG. 2, a caravan may be formed by a group of two or more vehicles 202. FIG. 2 further illustrates that the vehicles 202 belonging to the caravan may directly communicate with one another. For example, a vehicle computing device and/or a user computing device in one vehicle 202 may communicate directly (e.g., over radio waves or via a wireless local area network (WLAN)) with a vehicle computing device and/or user computing device in another vehicle 202 within the caravan. A caravan management program executing on the different computing devices may function to choose and tune devices to particular communication frequencies. In some cases, the caravan management program may also implement security features (e.g., distribute encryption keys for encryption) to create secure communication paths.

While computing devices in different vehicles may communicate directly, they may also communicate through the network 201. For example, a vehicle computing device and/or a user computing device in one vehicle 202 may indirectly communicate via a cellular backhaul with a vehicle computing device and/or user computing device in another vehicle 202 within the caravan. The caravan management program executing on the different computing devices may function to set up cellular calls, satellite calls, short message system (SMS) messages, and/or other means for exchanging information over a wireless communication system (e.g., a cellular backhaul). In some embodiments, instead of directing information to another computing device participating in the caravan, each computing device may direct information to an administrative computing device 100a or an application server 203 that may collect all information and from which information can be either pulled by other computing devices upon request or automatically pushed to the other devices participating in the caravan. For example, one computing device in a first vehicle 202 may send information to an application server 203, and another computing device in a second vehicle 202, belonging to the same caravan as the first vehicle, may pull the information from the application server 203 so that essentially the computing devices in different vehicles can communicate with one another.

In some embodiments, one or more of the application servers 203 may be configured to provide a service that receives trip data from participants in the caravan so that participants, insurers, or others can review the trip data. For example, an application server 203 may host a website that users can visit to see how well drivers performed during past trips and other details regarding past trips (e.g., where the team stopped for lunch last time). Insurers may also access the application server 203 to evaluate how well their customers drive and who their customers drive with. In some examples, the application server 203 may aggregate trip data for a number of trips on a group-by-group basis (e.g., for a number of trips by a particular team) and provide a webpage containing a leaderboard that ranks the different caravan drivers for the group (e.g., team). By ranking the caravan drivers, the leaderboard may create competition among caravan drivers to drive more safely. In some embodiments, one or more of the application servers 203 may be dedicated to a particular geographical area for storing and sharing information with a caravan regarding the geographical area (e.g., city, town, state, etc.). For example, an application server 203 may provide information to a lead vehicle (or computing device therein) informing the lead vehicle that the caravan is entering a construction zone or about to hit traffic within the geographical location.

Still referring to FIG. 2, the administrative computing device 100a may be configured to generate, edit, manage, and deliver the caravan management program. The caravan management program may be downloaded, installed, and executed on one or more mobile computing devices, such as user computing devices (e.g., smartphones) and vehicle computing devices (not shown in FIG. 2), within the vehicles 202. In some examples, the administrative computing device 100a may execute the caravan management program in tandem with a user computing device and/or vehicle computing device. The administrative computing device 100a may, for example, render graphics and webpages which are then streamed to the mobile computing devices within the vehicles 202, which may be used to supply user inputs so that the user may interact with the caravan management program.

Figure 3:
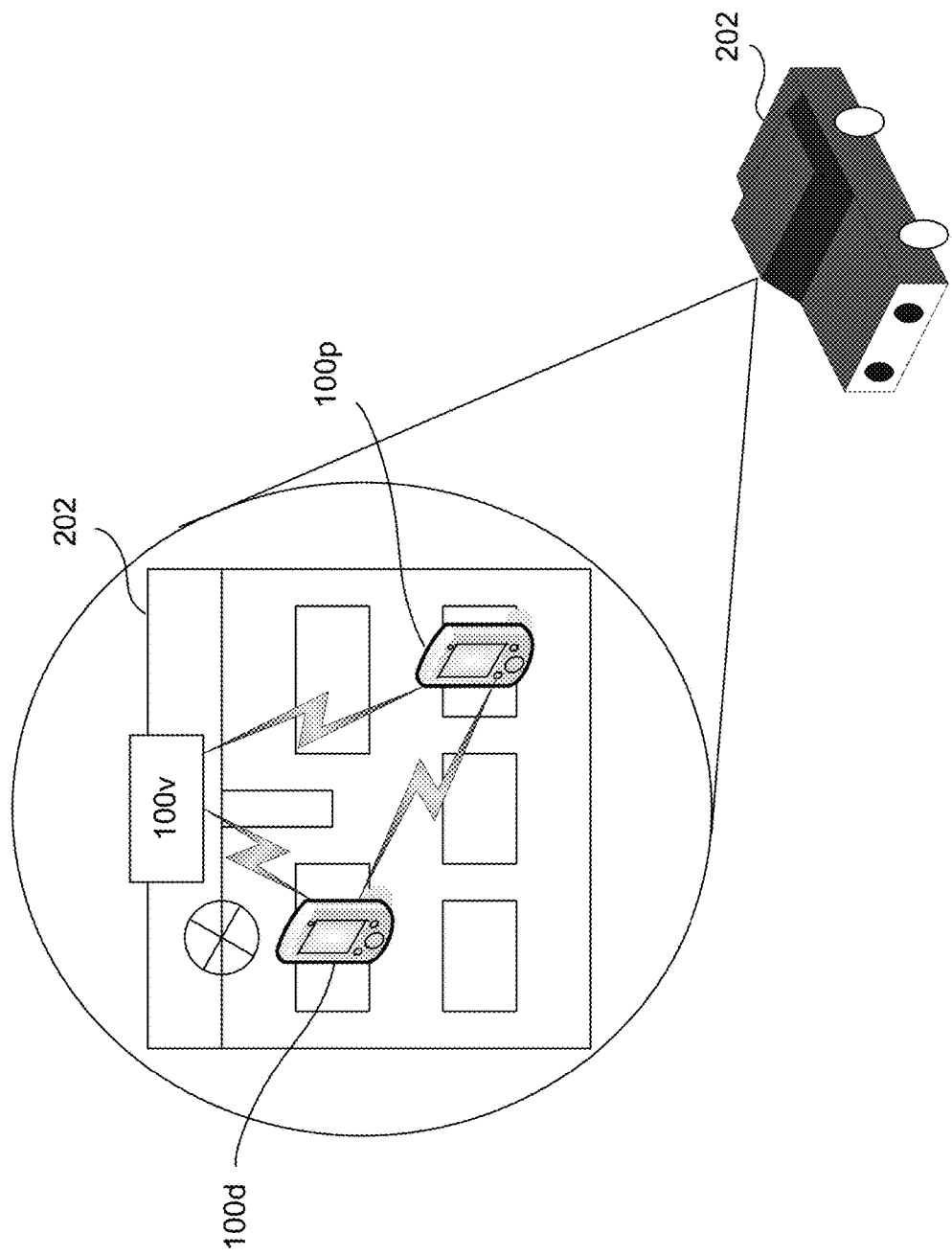
FIG. 3 illustrates an example subsystem for implementing aspects of the present disclosure.

FIG. 3 illustrates an example subsystem within the network environment 200. Specifically, FIG. 3 illustrates an example arrangement of mobile computing devices that may exist within one of the vehicles 202 of FIG. 2. FIG. 3 includes an exploded view of the inside of a vehicle 202 to illustrate example operating positions and lines of communication of the various mobile computing devices. As shown in FIG. 3, a driver computing device 100d, a passenger computing device 100p, and a vehicle computing device 100v may communicate with one another. The driver computing device 100d may be any mobile computing device (e.g., a smartphone, tablet, etc.) that is associated with a driver of the vehicle 202. Meanwhile, a passenger computing device 100p may be any mobile computing device (e.g., a smartphone, tablet, etc.) that is associated with a passenger of the vehicle 202. The driver and passengers of a vehicle 202 may change, and thus, so may the status of their mobile computing devices. As a person's status as a driver or passenger changes, the status (or mode) of their mobile computing devices as a driving computing device 100d or passenger computing device 100p may change as well. For example, when a person is driving a vehicle 202, his/her mobile computing device may be considered a driver computing device 100d. But, if he/she becomes a passenger, his/her mobile computing device may be considered a passenger computing device 100p. Whether a user device is a driver computing device 100d or a passenger computing device 100p may affect what functions the user device performs during the caravan. For example, the driver computing device 100d might not allow text messages or phone calls to be made during a trip, and may instead use driver preferences as driver inputs (e.g., inputs for voting purposes). Also, the driver computing device 100d may collect drive data using, e.g., its accelerometer, while the passenger computing device 100p might not be used to collect such drive data.

Although FIG. 3 depicts just one passenger computing device 100p, the vehicle 202 may carry a plurality of passengers each associated with a separate passenger computing device 100p. In some embodiments, two or more passengers may share a passenger computing device 100p. Also, although FIG. 3 depicts one driver computing device 100d, where the vehicle is operated by more than one driver, there may be multiple driver computing devices 100d. Moreover, if the vehicle is autonomous, there might not be any driver computing devices 100d. Further, in some embodiments, the vehicle computing device 100v may operate as one, or both, of a driving computing device 100d and a passenger computing device 100p. For example, a driver and passenger may take turns inputting information through the vehicle computing device 100v, such that the vehicle computing device 100v is associated with multiple people, and thus, serves as both a driver computing device 100d and passenger computing device 100p.

The vehicle computing device 100v may include the vehicle's on-board diagnostic (OBD) system. The vehicle computing device 100v may be configured to interface with one or more vehicle sensors (e.g., fuel gauge, tire pressure sensors, engine temperature sensors, etc.). The vehicle computing device 100v may also interface with the driver computing device 100d and/or passenger computing device 100p via a wired connection (e.g., USB, OBD II connector, etc.) or a wireless connection (e.g., Bluetooth). In some embodiments, there might not be a vehicle computing device 100v installed in the vehicle 202 that is configurable to participate in caravan management, or the vehicle computing device 100v might not be able to communicate with any of the mobile computing devices. Still, in some cases, the vehicle computing device 100v might be configured so that it only communicates with a subset of the mobile computing devices within the same vehicle 202.

In some embodiments, one or more of the vehicles 202 in a caravan may be autonomous or in an autonomous mode (e.g., auto-pilot mode). An autonomously controlled vehicle 202 may be controlled by its vehicle computing device 100v and/or a remote computing device (e.g., administrative computing device 100a). The vehicle computing device 100v may employ sensors for inputting information related to a vehicle's 202 surroundings (e.g., distance from nearby objects) and use the inputted information to control components of the vehicle 202 to steer the vehicle 202. The vehicle computing device 100v may use route information generated for a caravan to steer the vehicle 202 to a desired destination.

In light of FIGS. 2 and 3, it should be understood that a number of communication paths are disclosed. Any one of the driver computing device 100d, passenger computing device 100p, and vehicle computing device 100v in one vehicle 202 may communicate with any one of such devices in another vehicle 202 within a caravan. Various communication protocols may be used between the various computing devices 100 within a vehicle 202. Moreover, devices within a single vehicle 202 may communicate using one protocol (e.g., Bluetooth), while devices in different vehicles 202 may communicate using a separate protocol (e.g., a satellite protocol). In some examples, WiFi Direct may be used for direct communications between devices within a particular range. In such examples, the device in the WiFi Direct network having the fastest or most reliable connection may be used to communicate with devices in the cloud (e.g., an administrative computing device 100a or application server 203) and/or other devices not in range. As such, devices in one vehicle 202 may take advantage of devices in another vehicle 202 of the caravan that have a better connection.

Figure 4:
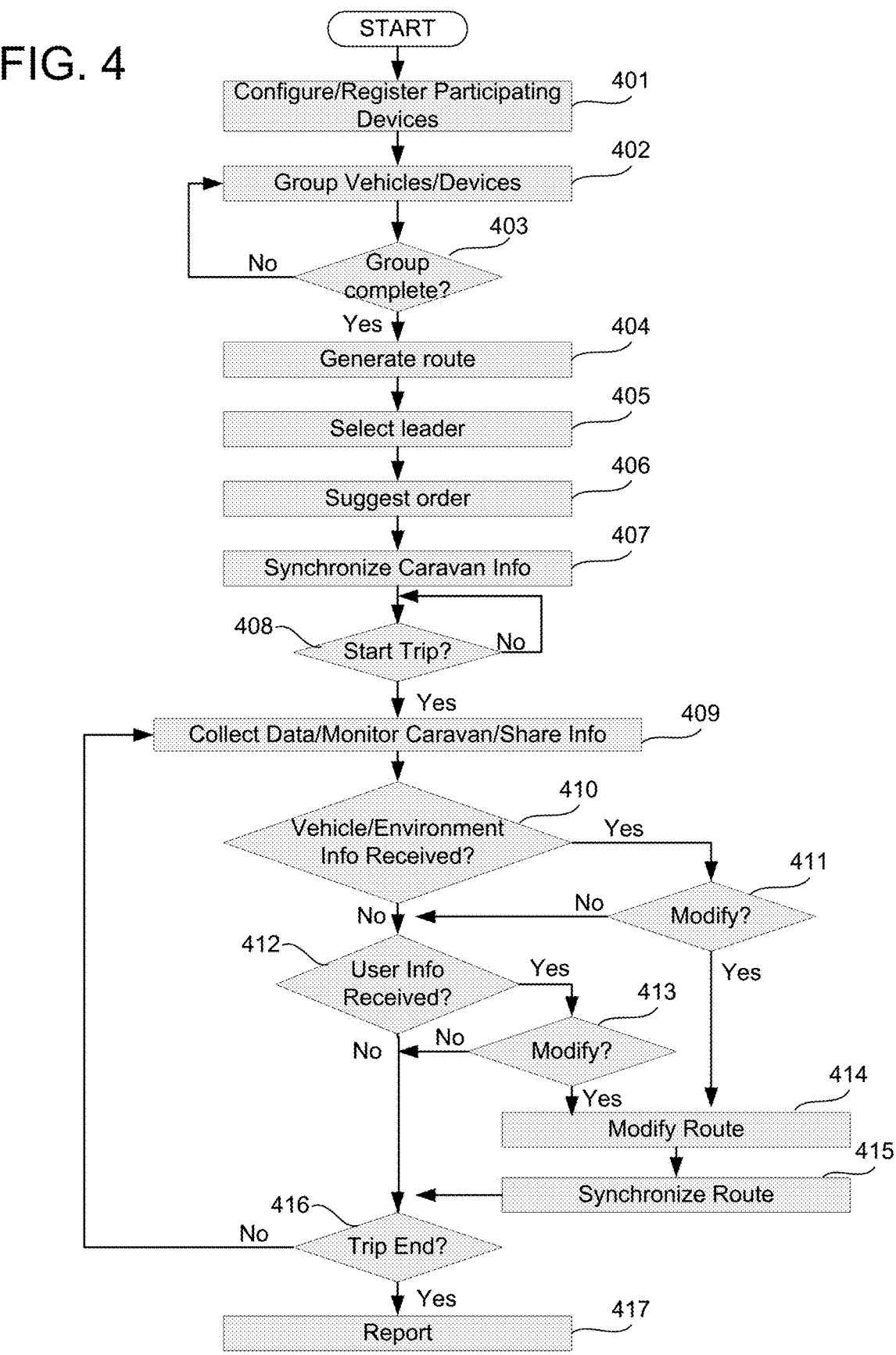
FIG. 4 illustrates a flow diagram of an example process in accordance with aspects of the present disclosure.

FIG. 4 illustrates a flow diagram for an example method in accordance with aspects of the present disclosure. More specifically, FIG. 4 illustrates a plurality of steps of a method of caravan management performed by one or more of a driver computing device 100d, passenger computing device 100p, vehicle computing device 100v, administrative computing device 100a, and/or an application server 203, which collectively form a caravan management system. One or more of the steps of FIG. 4 may be performed by executing a caravan management program and/or operating a particularly configured computing device of the caravan management system. As a result of the method of FIG. 4, vehicles 202 may be grouped to form a caravan and information may be processed to manage the caravan throughout the duration of a trip.

The method of FIG. 4 may begin with a step 401 of configuring and/or registering participating computing devices (e.g., a vehicle computing device 100v, a driver computing device 100d, and a passenger computing device 100p). Participating computing devices refer to any one of the computing devices that may participate in the caravan. Any computing device may be configured to participate in the caravan. Configuring a computing device to participate in a caravan may include installing a caravan management program. Each computing device may install a different version of the caravan management program depending on its platform. For example, a computing device running the iOS™ operating system may download a different version of the caravan management program than a device running the ANDROID™ operating system. Although the caravan management programs may be designed for different platforms, once installed they may allow the computing devices using different platforms to participate in the same caravan. Also, in some cases, step 401 may include downloading the caravan management program from an administrative computing device 100a or application server 203 via the network 201.

Step 401 may also include registering a participating computing device with a service provider (e.g., an automobile insurance company) providing a caravan management service. Registration may be performed the first time the caravan management method is performed using a computing device (e.g., the first time a caravan management program is executed on a particular computing device), and/or each time it is desired to enter the computing device into a caravan. Registering a computing device may include creating and/or logging into an account with an associated username and/or password. The account may be associated with the computing device and/or user of the computing device. To perform registration, a service provider may request various information, including information regarding a user device (e.g., device identifier, device make, device model, etc.), information regarding a user (e.g., name, birthdate, address, insurance policy number, etc.), and/or information regarding a vehicle (e.g., make, model, year, vehicle identification number (VIN), etc.).

Additionally, a participating computing device may be registered with other service providers, such as providers of weather information, map information, traffic information. For example, a participating computing device may register with a weather service providing weather information to registered members at periodical intervals or in emergencies. The participating computing device may use the weather information to modify the caravan's route or a schedule of the caravan. For example, if a storm is expected, the participating information may use such information to suggest that the caravan start earlier so that the vehicles 202 are not driven in bad weather.

Each time a user logs into an account to join a caravan, the user may designate whether his/her computing device is a driver computing device 100d or passenger computing device 100p. In some examples, the caravan management method may include logic and/or software for preventing more than one user from designating their computing device as a driver computing device 100d when there is only one driver. Moreover, in some embodiments, a mobile computing device (e.g., smartphone) may be automatically registered as a driver computing device 100d or a passenger computing device 100p. The position of a smartphone within the vehicle 202 may be detected to determine whether the smartphone is a driver computing device 100d or passenger computing device 100p. For example, the vehicle computing device 100v may employ one or more sensors (e.g., a retinal scanner) to identify which person is in the driver seat, and use this identification to determine that the driver's smartphone is a driving computing device 100d.

In some embodiments, when registering for the caravan management service, a user may create a profile associated with a computing device or user of the computing device. The profile may include certain user preferences so that a customized experience may be realized. For example, a user may create settings that affect how a user enters information and which types of information may be entered. A user profile may store which icons (or images) are used to represent a corresponding user's desires to others. The profile may also include one or more listings identifying preferred restaurants, gas stations, etc. of a user that may be considered when planning and/or modifying a route. In some embodiments, profiles may be created or updated automatically by a computing device (e.g., administrative computing device 100a or application server 203) configured to implement an artificial neural network to learn user preferences. The artificial neural network may use statistical information (e.g., demographical information) and one or more preferences indicated by a user to generate additional preferences to fill-out a profile. A profile may also be generated based on past user inputs. For example, if a user typically chooses or desires to stop at a fast food restaurant at around 11:30 am, the profile may be updated accordingly so that the profile may supply such information to a computing device attempting to generate or modify a route. Profiles may also be automatically populated with information based on information collected from additional sources. For example, driving data collected by an insurance company for a user may be used to set a preference for that user indicating that the user prefers to avoid highways. Another example source may include a social media network database, such as a Facebook™ server. Information from a social media network data, such as a user liking a restaurant, may be used to generate preferences in a profile. Some preferences may be generated using default values when information to determine the preferences cannot be determined or has not yet been determined. It should be understood that numerous preferences may be included within the profile. In particular, the profile may include route preferences directed to preferences that can be used as a basis for generating and/or modifying a route (e.g., preferences to avoid tolls) and/or caravan preferences directed to preferences that can be used to assemble the caravan (e.g., a preference to be the leader or the follower, a preference to be the driver of a vehicle, etc.).

Step 401 may be triggered manually or automatically. That is, a user may choose when to configure (e.g., download and/or install) and register a computing device or a computing device may initiate processes of step 401 automatically. In the latter instance, a computing device may automatically detect that it is proximately located with a vehicle, and therefore, may register with a caravan management service provider so that it may participate in a caravan. For example, if a user carries his/her smartphone into his/her vehicle, the smartphone or vehicle computing device 100v within the vehicle 202 may detect that the smartphone is inside the vehicle and may log into a user account so that the user may continue to join a caravan in step 402.

At step 402, vehicles 202 are grouped together to form a caravan. Various processes may be used to set up the caravan. In one example, a user may create a caravan name. The user may also designate an associated password for the caravan. Then, others may enter the caravan name and/or password into a participating computing device to incorporate the participating computing device into the caravan. For example, a first person may enter a caravan name and password into a first vehicle computing device 100v of a first vehicle 202 and a second person may enter the same caravan name and password into a second vehicle computing device 100v of a second vehicle 202 so that the first and second vehicles 202 are joined into a single caravan. Moreover, the same caravan name and password may be entered into mobile computing devices, such as a driver computing device 100d and a passenger computing device 100p, so that mobile computing devices can also be joined together in the caravan.

Alternatively, a caravan name and/or password may be entered into one participating computing device, which may then broadcast an invitation to other potential participating computing devices in the same or a separate vehicle. A user may enter user names associated with others in the caravan and send them an invitation, or could view a list of other individuals that he/she had previously participated with in a caravan and invite them to a new caravan. In another example, a caravan may be created by running a caravan management program on two or more mobile computing devices and "bumping" the mobile computing devices to indicate the desire to create a caravan. Bumping the mobile computing devices may allow each device to exchange communications via a near field communication (NFC) system. When such bumping occurs during a caravan set up mode, each device may detect the desire to participate in a caravan with the other. Additionally, or alternatively, to create a caravan, a user may use a mobile computing device to scan or enter VIN numbers of vehicles 202 that he/she would like to join together in a caravan. Then, once a group of VIN numbers is collected, a name or other identifier (e.g., Caravan ID#) may be assigned to the caravan. Each participating computing device (e.g., vehicle computing device 100v, driver computing device 100d, and passenger computing device 100p) may then be joined into the caravan by entering the caravan name or other identifier. Further, in some embodiments, computing devices configured to participate in a caravan may prompt a user to join a caravan when detecting that other computing devices within a predetermined distance (e.g., 300 ft) are also configured to join a caravan. In other embodiments, potential participants may be informed to go to a particular spot to start the caravan, and then select to be in a caravan associated with that spot (e.g., select a join button when prompted upon reaching the spot). One or more of the participating devices may become associated with a caravan when they are all in a similar spot and their users select to join a caravan with others at that spot. Regardless of the manner in which the caravan is created, for each created caravan, the caravan management system may generate a caravan identifier (e.g. Caravan ID), so that information regarding the caravan may be cataloged.

As each participating computing device (e.g., vehicle computing device 100v, driver computing device 100d, and passenger computing device 100p) joins the caravan, it may be assigned a unique identifier (referred to as a participating device ID). This participating device ID may include an alphanumeric code or other identification information. Moreover, the participating device ID may be assigned by a counter that increments a certain amount each time it assigns a new identifier thereby generating a unique identifier for the various participating devices. The counter may be implemented by hardware and/or software in any one of the participating computing devices, the administrative computing device, or an application server 203. Further, as participating computing devices join the caravan, users of such devices may be prompted for additional information. For example, a user may be prompted to specify which vehicle 202 the participating computing device will be travelling in and/or whether the user of that device will be a passenger or driver. In some cases, the user may even specify which seat he/she will be sitting in. Other information collected from a user may include how many passengers will be in the vehicle (whether they have a computing device that will participate in the caravan management system or not), whether the user plans to sleep during the trip or would like to chat with other participants, how much the user weighs, etc.

Information from other databases may also be used to form the caravan. For example, if a user has joined a caravan using their smartphone, a database (e.g., auto-insurance database) associating users and their vehicles 202 may be accessed and analyzed to determine to automatically add a vehicle 202 associated with the user. Vice versa, if a vehicle 202 has been entered, a computing device (e.g., smartphone) of a user associated with that vehicle 202 may be automatically joined to the caravan. A license plate could be entered to identify a vehicle 202 to join a caravan, and a user (and his/her personal computing device) who is registered to that vehicle 202 may be joined to the caravan. Once a computing device is joined to a caravan, other computing devices in close proximity to that computing device or in communication with that computing device may be automatically joined or invited to join the caravan. In some embodiments, a computing device may determine that two or more vehicles 202 are traveling in close proximity along a similar route for a certain amount of time, and automatically join the two or more vehicles 202 and/or computing devices therein or associated therewith in a caravan. In some cases, data collected from red light cameras or other imaging devices and/or tracking devices maintained by, for example, other sources (e.g., a local government) may be used to determine whether two or more vehicles are travelling together.

As a result of creating a caravan at step 402, one or more, or all, of the participating devices, the administrative computing device 100a, or an application server 203 may store group information for a particular caravan. The information may be stored in such a manner that certain pieces of information are associated with one another. Such relationships may be represented by Table 1 below.

TABLE 1

| Caravan Name: Wildcats Youth Basketball Team Caravan ID: caravan123 | | | | |
|---|---|---|---|---|
| Participating Device ID | Device Status | User | Vehicle ID | Device OS |
| 1 | Driver computing device | Amy | #1 | iOS |
| 2 | Vehicle computing device | Bob | #2 | ANDROID |
| 3 | Driver computing device | Claire | #3 | ANDROID |
| 4 | Passenger computing device | David | #1 | ANDROID |

As shown in Table 1, for each participating computing device in the caravan, a participating device ID, device status, user's name, vehicle ID (e.g., VIN number or other identifier identifying which vehicle the device is in), and a device OS (identifying an operating system of the device) may be stored in association with each other. Although Table 1 depicts that each of the fields has a value, in some embodiments, the value in a field may be null. For example, Table 1 shows that the name, Bob, of the driver of vehicle #2 is stored in association with the vehicle computing device in vehicle #2, however, in some embodiments, there might not be a user name stored in association with a vehicle computing device. Table 1 is illustrative only, and many other types of information may be stored in association with each other for a particular caravan.

In step 403, the caravan management method may determine whether all vehicles desiring to be a part of the caravan have been joined. In some examples, one or more users of a participating computing device may be prompted to indicate whether all vehicles have been joined. Upon being prompted, a user may specify that grouping of vehicles is complete so that the caravan management method proceeds to step 404. Otherwise, the participating computing devices may remain in a caravan set up state (or mode) in which one or more of such devices are used to add vehicles to the caravan. In some embodiments, the caravan management system may have a predefined list of vehicles, and may automatically detect when all vehicles on the list have been grouped. For example, a team manager might obtain vehicle information ahead of time and set up a preliminary list of vehicles or people expected to be in an upcoming caravan. Then, at the time of departure for the trip, the system may detect whether all vehicles or people on the preliminary list (or a certain number of vehicles or people equal to an expected number) are proximately located and in communication with one another.

Step 403 may include checking that each of the participating computing devices can communicate with at least one other participating computing device so that all participating computing devices may be effectively linked. For example, in some embodiments, all communications may go through a vehicle computing device 100v in the lead vehicle, and therefore, determining that the group is complete at step 403 may include confirming that all participating computing devices can communicate with the lead vehicle 403.

Once each of the vehicles to be included in the caravan is joined and grouping is completed, the caravan management method may proceed to step 404. Notably, in some embodiments, additional vehicles 202 and/or participating computing devices may join the caravan during the trip. For example, a person may be running late, and may choose to join up with the caravan after it has already begun its trip. Also, a driver or passenger may install and download the caravan management program on his/her mobile computing device during the trip, and may join the caravan by registering his/her computing device as a participating computing device during the trip.

At step 404, a route may be generated for the caravan. A user may enter destination information indicating an intended destination for the caravan. A user may also enter starting point information indicating a starting point of the caravan or this information may be automatically detected from coordinates received from a GPS receiver or cellular base station. This destination information and/or starting point information may be entered into one of the participating computing devices (either a vehicle computing device 100v, driver computing device 100d, or passenger computing device 100p). This information may then be used by the participating computing device that inputted the information or any other computing device in the caravan management system, including any one of the administration computing device 100a, an application server 203, or any of the participating computing devices, to generate a route. The route may be generated by referencing map data which may be stored in whichever device generates the route or another server dedicated for storing map data (e.g., an application server 203). In some examples, generating a route may include transferring starting point and destination information to a third party server configured to return one or more potential routes.

In addition to generating a route using map data, other information may be used. For example, the route may be generated based on traffic information, time of day, weather information, construction information (e.g., information indicating that a particular stretch of road is under construction or subject to a detour), road conditions (e.g., slippery, flooded, etc.), types of roads (e.g., highway, residential, etc.) and the like or any combination of such information. The route generated for the caravan may be different than if the route were generated for a single vehicle. For example, a route with fewer traffic lights may be generated such that the caravan is less likely to be split up. Or, a route with less traffic may be taken so that other vehicles 202 not in the caravan are less likely to come between vehicles 202 in the caravan. Moreover, in some embodiments, the route may be determined for the caravan as a whole taking into account the different abilities of the different drivers participating in the caravan. The abilities of the drivers may be represented by past vehicle telematics data and/or insurance rate information. Each driver in the caravan may be assigned a score for each piece of criteria used to generate the route, and the scores may be processed to determine the routes that best suit the caravan. The scores for each driver may be determined based on past driving history records including drive data (e.g., vehicle telematics data) for the particular driver.

If there is an insufficient data set for determining a particular score for a particular driver, then a default score (which may be based on statistical models) may be assigned as the particular score for that particular driver.

By way of example, if one driver in a caravan has a good score for driving on highways, but two other drivers in the caravan have bad scores for driving on highways, the generated route might avoid highways or reduce the use of highways to better suit the skills of the caravan as a whole. Different criteria may be weighted differently as well. In other words, weather information may have more influence over which route is generated than traffic information. The scores and/or information representing the abilities of each of the drivers may be collected from a driver computing device 100d of each of the drivers in the caravan.

Additionally, or alternatively, insurance rate information of each of the drivers in the caravan may be considered in generating the route for the caravan. First, a list of potential routes may be formed, and each route may be assigned a safety rating. Then, the insurance rate information of each of the drivers in the caravan may be evaluated to determine which route to recommend. If the insurance rate information of the drivers indicates that the drivers are well experienced and skilled (e.g., their rates are low), the caravan management system may suggest the fastest route even though that route may be comparably riskier. In comparison, if the insurance rate information of the drivers indicates that the drivers are not well experienced or skilled, the caravan management system may suggest a slower route that is safer.

When generating the route, the caravan management system may also consider past driving behavior of similar caravans. In other words, the system may consider drive data of trips including a similar group of drivers. For example, a youth baseball team may travel relatively often, and therefore, parents of the team may form caravans relatively often. Drive data collected for past trips of the team caravan may be used for generating future routes of the team caravan.

The system may also recognize that a driver's behavior may be different depending on who else is participating in their caravan. For example, a typically safe driver may modify their typical behavior to drive faster and/or more reckless when following a typically unsafe driver. Accordingly, the system may treat typically safe drivers as unsafe drivers depending on who else is in their caravan thereby leading to a recommendation of a safer route than otherwise would be suggested. Vice versa, the system may determine that unsafe drivers drive more cautiously when around other safe drivers, and therefore, may suggest a route that is riskier despite the inclusion of the typically unsafe driver.

In some embodiments, multiple routes may be generated in step 404 and participants in the caravan, through their respective participating computing devices, may vote on which route to take. In some instances, only driver computing devices 100d may be allowed to vote on the route. In addition to, or instead of, voting on a route to take, the caravan management system may generate a route based on user preferences stored in user profiles of one or more participants. The caravan management system may receive user profiles from each of the participating computing devices and determine which route suits the group's desires. For example, if a majority of profiles of the participants indicate that McDonald's™ is a desired restaurant for lunch, the caravan management system may generate or suggest a route that would include a stop at McDonald's at lunch time. In any event, as a result of step 404, a generated or suggested route may be set as the initial route.

In at least one example, generating a route in step 404 may include determining or selecting a leader as described below with respect to step 405. Subsequently, preferences of a subset of or all users in the caravan may be factored into an algorithm for generating the route and the algorithm may give more weight to the leader's preferences. The algorithm may initially compute several routes from a starting point to a destination point. Then, the computing device generating the route may determine the safest route within a percentage of time of the fastest route. Therefore, if, for example, the fastest route is three hours and a 10% temporal range is used, the computing device may choose another route that is safer and estimated to be about 10 minutes longer than the fastest route (because 10 mins. is within 10% of 3 hours). Using a percentage of time factor may prevent the caravan management system from suggesting a much slower route. For example, the system might not suggest a safer route that adds 10 minutes when the fastest route is 15 minutes. Once the general route (e.g., roads to be taken) is determined, the system may select stopping points along the general route. The system may take into account past behavior of one or more of the caravan participants when determining stopping points. For example, the system may detect that one participant stops as travel plazas at approximately every 2 hours (which may be the result of the participant having to use the restroom frequently or needing breaks to continue safely). If such behavior is detected, the system may modify the general route to include stopping points at approximately 2 hour intervals to generate the final route. In some cases, modifying the general route may include adding additional directions to take the caravan down different roads to get to stopping points and back to the general route from the stopping points.

In step 405, a leader of the caravan may be selected. Herein, the leader of the caravan may refer to the driver of the vehicle 202 that is chosen to lead the caravan. The leader driven vehicle 202 might not always be in front of the other vehicles in the caravan, but it may be desired that the other vehicles 202 in the caravan attempt to follow the leader driven vehicle 202. The caravan management system may allow users of each of the mobile computing devices participating in the caravan to vote on who should be the leader. In other words, the caravan participants may be polled to determine the leader of the caravan. To assist users in making this determination, the caravan management system may cause information regarding each of the drivers in the caravan to be displayed to those voting. This information may be obtained from, for example, user profiles on the various driver computing devices 100d or vehicle computing devices 100v participating in the caravan. In some embodiments, the insurance rates that one or more of the drivers pay may be displayed. Such insurance rate information may reflect how well and/or how safe a driver drives. Generally, safer drivers, or drivers who have avoided accidents, have lower insurance rates than drivers who drive more recklessly and/or have been involved in accidents. In a usage based insurance model, the leader may affect the insurance rate for all vehicles 202 in the caravan.

Additionally, or alternatively, the caravan management system may display other information such as drive data (e.g., vehicle telematics data) of each of the drivers in the caravan. The drive data may show how fast different drivers drive and/or how well they perform during braking and/or turning events. For each driver in the caravan, one or more scores may be assigned based on drive data collected from past drives (including drives that were part of caravans and drives that were not). In some examples, a score may be associated with each of a variety of categories, such as speed, braking, turning left, turning right, etc. Each driver may also be assigned an overall drive score. Still other information, such as an experience level of the driver may be displayed. For example, the number of months that a driver has had a license may be displayed and/or an experience score (e.g., 4 out of 5) may be displayed to each of the participants in the caravan. Also, a familiarity score indicating how familiar each of the drivers is with the generated route may be displayed. Some drivers may have prior experience driving along the generated route (e.g., as part of previous caravans), and such prior experience may improve a drivers familiarity score for a given generated route. The familiarity score may be calculated based on past drive data or each driver may be prompted to indicate their familiarity with the generated route. The familiarity score may help participants in deciding who to choose as their leader.

Further, in some embodiments, the caravan management system may recommend a leader based on one or more of the factors discussed above. For example, the caravan management system may choose the driver with the lowest insurance rate to be the leader of the caravan. Or, the caravan management system may choose as the leader the driver with the highest familiarity score among the drivers in the caravan. By using the caravan management system to recommend the leader, disputes over who should be the leader can be more easily settled.

A combination of polling the caravan participants and automatically selecting the leader may be implemented as well. For example, participants may vote for the top two and the system may choose between those two drivers. Alternatively, the system may recommend several options for the leader, and leave it to the participants to vote which one they wish to be their leader. After selecting a leader, whether by polling the caravan participants and/or using recommendations from the caravan synchronization system, the caravan management system may store an indication of which driver computing device 100d, vehicle computing device 100v, and/or vehicle identifier (e.g., Vehicle ID) has been selected. Knowledge of who should be the leader may be used by the caravan management system to monitor the state of the caravan (e.g., check whether the vehicles 202 in the caravan are keeping up with the leader).

In addition, in some embodiments, the caravan management system may suggest an order that the vehicles should travel in during the trip. Generally, vehicles 202 of a caravan follow the leader in a single file. Using any of the factors discussed above for recommending a leader, the caravan management system may also recommend an order of the vehicles 202 to follow the leader. By recommending an order of the vehicles, the caravan management system may improve the overall safety of the caravan. For example, the caravan management system may take into account that drivers of vehicles 202 at the end of the caravan may be in a situation where they have to decide whether they should make it through a traffic light to keep up with the caravan or should stop at the traffic light and let the caravan go ahead. Some drivers may be more likely to drive through a red light, and thus, might not make for good candidates to drive vehicles 202 at the end of the caravan. The caravan management system may also detect (from previous driving data, passenger comments, and/or driver preferences) whether a driver tends to get anxious or jittery (and thus possibly drives more dangerously) when they fall too far behind and feel a need to catch up to the vehicles they are following. If the caravan management system detects such behavior, the caravan management system may recommend those drivers being towards the front (in the leader spot or closer to the leader) of the caravan. In contrast, the caravan management system may recommend that a driver who has demonstrated a level of comfort when falling behind and/or attempting to make up distance be situated at or towards the rear of the caravan. Familiarity with the route may also be factored into determining the order. For example, the caravan management system may suggest that the most familiar driver or participant be the leader, and that the second most familiar driver or participant be in a vehicle at the rear in case any one of the vehicles falls behind. The second most familiar driver or participant may then help navigate others (and essentially become a second leader) or themselves until they catch up to the front portion of the caravan. The ordering of vehicles 202 within the caravan may also consider properties of the vehicles 202 themselves. For example, heavier vehicles (e.g., trucks) may require more stopping distance, and thus, it may be preferred to place them at the end of the caravan.

In step 407, any information pertaining to the caravan may be synchronized across each computing device participating in the caravan. For example, the generated route, information identifying the leader, information identifying an order of the vehicles, and/or information identifying the different vehicles 202 and participants in the caravan may be circulated to each of the vehicles computing devices 100v, driver computing devices 100d, and passenger computing devices 100p that have been registered in the caravan so that each of these devices has similar information. As such, if the route generated in step 404 is generated by an application server 203, that route may be distributed to each of the participating computing devices at step 407. As each participating computing device receives the caravan information, the route and other information may be displayed according to specific settings of the particular computing device displaying the information. Some participating computing devices may display a listing of directions for the route, while others may display a map with a highlighted path representing the route. In some embodiments, as a result of step 407, each vehicle computing device 100v participating in a caravan may cause a map to be shown on a display installed in the corresponding vehicle 202 so that the position of each vehicle 202 in the caravan may be viewed alongside the generated route that the caravan intends to follow.

Step 408 may include a determination of whether the trip has been started. This determination may be made automatically by detecting that the caravan is moving along the route or manually in response to a user input through one or more participating computing devices indicating that the caravan is ready to start the trip. To automatically detect the start of the trip the caravan management system may evaluate vehicle telematics data (e.g., GPS coordinates) to determine whether one or more of the vehicles are moving in the direction of the initially set route.

Once the trip begins, one or more of the participating computing devices may begin to collect drive data for a corresponding vehicle 202 in the caravan at step 409. Drive data may include vehicle telematics data in connection with how well a vehicle 202 brakes, turns (e.g., left turns and/or right turns), maintains a consistent speed, etc. The drive data may be collected by a vehicle computing device 100v of the vehicle 202 using measurements from a number of sensors positioned throughout the vehicle 202. Additionally, or alternatively, the drive data may be collected by a driver computing device 100d and/or passenger computing device 100p using a three-axis accelerometer, GPS receiver, gyroscope, or other instruments of such devices. When drive data for a particular vehicle 202 within the caravan is collected from more than one computing device, the drive data may be evaluated and processed to arrive at one set of drive data for the particular vehicle 202. This processing may be done by any one of the participating computing devices and/or an administrative computing device 100a or application server 203. Further, such processing may include merging the drive data or dropping drive data that appears incorrect based on statistical models or appears inconsistent with other drive data (for the same or another vehicle). For example, if drive data collected by a passenger computing device 100p is inconsistent with other drive data collected (for the same or another vehicle in the caravan) because a passenger was moving the passenger computing device 100p when it was attempting to collect the drive data, the caravan management system may drop the inconsistent drive data.

Also at step 409, the state of the caravan may be monitored. More specifically, one or more of the participating devices and/or an administrative computing device 100a or application server 203 may determine whether the vehicles 202 in the caravan are within a predetermined range of each other. This range may vary based on various factors, such as traffic conditions and road types. For example, the predetermined range may be greater where there is less traffic and/or the caravan is driving on a highway. Monitoring the state of the caravan may include determining that each of the vehicles 202 is maintaining a certain distance from the vehicle 202 directly ahead of it. Different distances may be used between different vehicles 202 depending on characteristics of the vehicles 202 or the drivers of the vehicles 202. For example, the caravan management system may determine that a safe driving distance between two cars should be three car lengths because the driver in the leading car brakes abruptly and the driver in the trailing car has slow reaction time. Meanwhile, two other cars in the caravan may be allowed to travel with a separation of two car lengths if the driver in the leading car typically brakes slowly and the trailing car has shorter stopping distance than the leading car. If the caravan management system detects that the distance between two particular vehicles 202 is too short (and thus creating a dangerous situation) and/or too long (and thus jeopardizing the chances of the caravan staying together), the caravan management system may alert each of the participating computing devices in the caravan or just those participating computing devices of the two particular vehicles 202 (e.g., just the driver computing devices 100d and/or the vehicle computing devices 100v associated with the two particular vehicles 202). The caravan management system may also alert a lead vehicle 202 (or one or more computing devices therein) to slow down to give lagging vehicles a chance to catch up. Further, in some embodiments, GPS positions of vehicles 202 may be monitored to determine whether a person strays too far from the generated route or the rest of the caravan (e.g., takes an exit that other vehicles in the caravan do not take). If the caravan management detects this scenario, it may send an alert to the departing vehicle 202 (or devices therein). In some cases, the caravan management system may prompt participants in the departing vehicle 202 to confirm whether they intend to leave the caravan. If they confirm that they do intend to leave the caravan or do not respond to the prompt, the vehicle 202 may be removed from the caravan. As such, the caravan management system may no longer consider preferences associated with those in the departing vehicle so as not to unnecessarily change the route for those no longer in the caravan. In comparison, the caravan management system may also monitor surrounding vehicles 202 and/or computing devices (e.g., within a certain proximity to the caravan) to determine whether other participants would like to join the caravan. For example, if a vehicle 202 that was expected to be in the caravan (but perhaps was running late and did not make it for the start) comes within a certain radius of at least one vehicle 202 in the caravan, that vehicle 202 may be joined to the caravan so that its preferences and preferences of persons therein may be considered. Moreover, in some embodiments, the caravan management system may detect whether a caravan has split up into two or more groups (e.g., because vehicles 202 have become separated), and may spawn two or more separate caravans. In such cases, the caravan management system may select new leaders for each of the new caravans. Also, in some cases, this arrangement may be temporary and one or more of the split up caravans may be rejoined (e.g., if a second caravan catches up to a first caravan).

Step 409 may be performed throughout the duration of the caravan's trip, and during the trip, various information may be shared among the participating computing devices. Such information may include dialogue among one or more of the people in vehicles 202 of the caravan. In this regard, the caravan management system may include a social networking component through which participants in the caravan may converse with one another. For example, the caravan management system may set up a type of chat room exclusively for participants of the caravan so they may share messages and/or pictures with the group. Certain participating devices (e.g., driver computing devices 100d) might be blocked from such conversations or may require only voice inputs to discourage or reduce the use of such participating devices by drivers while they are driving.

Other information may also be shared at step 409. Examples of such other information may include user preferences (e.g., preferred places to eat, preferred places to get fuel, etc.), detected road conditions, detected weather information, detected traffic condition, fuel information of the respective vehicles 202, position information of the vehicles 202, etc. In some embodiments, information regarding how well each driver is driving may be shared. Such information may be gauged based on vehicle telematics data collected by one or more of the participating devices. By sharing such information, drivers may be persuaded to modify their driving behavior to drive more carefully.

Further, the caravan management system may also monitor and learn about user behavior and preferences during the trip. For example, the caravan management system may evaluate which restaurants a user votes for during a trip and updates that user's preferences based on the learned information. Additionally, a caravan management program may run in the background of a user's computing device to obtain preferences even when the user is not in a caravan. For example, the caravan management program running on a user's smartphone may monitor where users drive to and how they travel there while driving alone (not part of a caravan), and may detect where users shop and/or dine (also when not part of a caravan) to determine user preferences.

In step 410, the caravan management system may detect when vehicle information and/or environmental information is received. Vehicle information may include any information pertaining to a vehicle 202 in the caravan (e.g., engine temperature information, tire pressure information, etc.). Such vehicle information may be provided by one or more sensors installed on the vehicle 202 to the corresponding vehicle computing device 100v and/or user device (e.g., driver computing device 100d or passenger computing device 100p) within the vehicle 202. Meanwhile, environmental information may include any information pertaining to the environment in which the caravan is expected to travel. Such environmental information may include information from weather reports, traffic reports, construction changes, etc. Computing devices, such as an administrative computing device 100a or application servers 203, may provide updates regarding weather, traffic, and work schedules to registered participating computing devices of a caravan. The caravan management system may monitor compare previous reports with recent reports to determine whether there are changes or detect when changes or new reports are received. When such vehicle information and/or environmental information is detected at step 410, the caravan management system may determine whether to modify the route based on the detected information at step 411. Some information might not rise to a level of importance that justifies modifying the route. For example, the caravan management system may determine that a tire pressure of a vehicle 202, although low, is sufficient to continue along the current route to the destination. In contrast, some information may be troublesome and the caravan management system may determine that modification to the route is needed. For example, the caravan management system may determine that a vehicle 202 needs to be refueled based on received fuel information, and therefore, determines to modify the route so the vehicle 202 can get fuel. In another example, if information regarding a vehicle collision involving one of the vehicles 202 in the caravan is received, the caravan management system may determine that the route should be modified to allow the caravan to pull over.

In step 412, the caravan management system may detect when user information, which includes any information pertaining to a user (or participant) in one of the vehicles 202 in the caravan, is received. Such user information includes information regarding a user's desires during the trip. These desires may be entered through one or more interfaces of any one of the participating computing devices within the vehicle 202. For example, a passenger may operate a touch screen of his/her passenger computing device 100p to inform others in the caravan of his/her desire to stop to get something to eat, take a picture or otherwise view a landmark, use a bathroom, etc. In some embodiments, if a driver wants to enter similar desires, he/she may be required to enter the information through a driver computing device 100d or vehicle computing device 100v by speaking his/her desires. As such, certain participating computing devices, at certain times (e.g., when the caravan is moving), may employ voice recognition and/or speech to text software. In this manner, the caravan management system may discourage or deter drivers from operating other computing devices when they should be focusing on driving.

When user information is detected at step 412, the caravan management system may determine whether to modify the route based on the detected information at step 413. In some cases, before determining whether modification of the route is needed, the caravan management system may poll participants in the caravan. For example, if a user indicates a desire to stop at a particular restaurant for lunch, the caravan management system may poll all, or a subset of, those participating in the caravan. The participants may then vote to indicate whether they also desire or otherwise agree to stop at the particular restaurant. In some embodiments, a user may indicate they are hungry, and the caravan management system may generate and distribute a survey asking participants if they are hungry and/or where they would like to stop to eat. In some cases, rather than, or in addition to, generating a survey, the caravan management system may check user profiles of those participating in the caravan to recommend suggestions for places to stop. For example, if a user indicates he/she is hungry, the caravan management system may evaluate one or more user profiles indicating preferred restaurants, and distribute a list of recommended places to stop, based on the user profiles and/or information about which places are available in proximity to the generated route, for participants to choose from. The results of the polling and/or survey may be analyzed to determine whether the route should be modified. If enough people agree to stop or indicate a desired place to stop, the system may determine to modify the route.

When the caravan management system determines that vehicle information and/or user information mandate modification of the route (YES at 411 or YES at 413), the caravan management system modifies the route at step 414. Modification of the route at step 414 may account for any of the factors discussed above with regards to initially generating the route at step 404. In particular, modification of the route may be performed with the interests of the caravan as a whole in mind. For example, by analyzing fuel levels (e.g., battery levels in the case of electric vehicles) of each of the vehicles 202 in the caravan, the caravan management system may determine a suitable (or optimal) place to stop to refuel or recharge.

After modifying the route at step 415, each of the participating computing devices may be synchronized to include the modified route. For example, the modified route may be pushed to one or more (or all) of the participating computing devices in the caravan, so everyone may be informed of the route modification. As such, the caravan management system may assist in keeping the vehicles 202 of the caravan together. Moreover, sharing modified route information may prepare drivers for upcoming driving maneuvers so that there is no or less confusion thereby potentially improving the overall safety of the caravan. Synchronization of the route at step 415 may be similar to the synchronization performed at step 407, and thus, is not further described here.

In step 416, the caravan management system may determine whether the trip has ended. Any one of the participants, either passengers or drivers, may manually indicate the end of the trip. Alternatively, the caravan management system may automatically determine that the trip has ended by determining that the caravan has reached its destination. Until the trip has ended, the caravan management system may continue to collect drive data, monitor the state of the caravan, share information, and analyze received vehicle and user information.

When the trip has ended, the caravan management system may generate a report at step 417. The report may indicate the actual route taken, and information in connection with that actual route, such as how long the trip took, where the caravan stopped, how long it stopped for at each stop, etc. In step 417, the caravan management system may also report information regarding each of the vehicles 202 in the caravan, such as how efficient the vehicles 202 were (e.g., gas mileage, percentage of battery power used, etc.), an average speed of each of the vehicles 202, and the like. Further, the caravan management system may report information pertaining to each of the drives in the caravan, such as an overall drive score, a rating or ranking of how smooth each driver's braking was, a rating or ranking of how well each driver executed turns, a rating or ranking of how smoothly each driver accelerates, a rating or ranking of how well a driver maintained a steady speed, and the like. The report may also include a transcript of the dialogue exchanged during the trip.

The report generated in step 417 may be transferred to each of the participating computing devices. Moreover, in some embodiments, the report may be stored in a database on the network 201, such as a database of an application server 203. Thus, the report may be accessible in the future, when a similar caravan is formed (e.g., when a similar group of vehicles get together or when another caravan of vehicles 202 takes a similar route).

FIGS. 5A-5B illustrate various user interfaces generated by the caravan management system. These user interfaces may be displayed on any display connected to one or more (or all) of the participating computing devices (e.g., vehicle computing devices 100v, driver computing devices 100d, and passenger computing devices 100p) participating in a caravan. Moreover, any of the participating computing devices may be configured to generate these user interfaces.

FIG. 5A illustrates a user interface 500 for allowing a user to join, create, and/or review a caravan. The user interface may include a list of available caravans. This list may include a list of all caravans (or a subset thereof) that have been managed by a service provider. Alternatively, the list of available caravans may be specific to a particular user viewing the list after registering and/or logging-in. Referring to FIG. 5A, for example, a parent ("Amy") may log-in to a caravan management service using her smartphone to view a list of available caravans, which are associated with organizations that her children ("Rob," "Sandy," and "Tommy") belong to, and which she ("Amy") may have previously participated in. If Amy wishes to join a caravan associated with one of the organizations that she previously participated with in a caravan, she may choose the appropriate "Join" key. Certain organizations may travel in caravans more than once, and therefore, the caravan management system may store settings of caravans for simplifying set up of future caravans involving similar participants.

From the user interface 500, Amy may also choose to review a report of her past caravan experiences by selecting one of the "History" keys. Alternatively, Amy may desire to create a new caravan to participate in with other vehicles 202 in anticipation of an upcoming trip. As illustrated in the user interface 500, in some cases, a caravan may be set up in advance by an administrator (e.g., team captain, team parent, coach, etc.) to specify all expected participants or invited participants. Then, when an expected or invited participant views the user interface 500 as the time for the trip approaches, the user interface 500 may provide an invitation to join the upcoming caravan and/or notice that a caravan is set up and waiting for the participant to join.

FIG. 5B illustrates a user interface 510 that displays a survey to one or more of the participants in a caravan. The survey may be generated and appear as a prompt on each participating computing device when one or more participants in the caravan indicate a desire that may cause the caravan's route to be modified. Specifically, in the example of FIG. 5B, when one or more participants indicate that they are hungry, one or more of the participants (or all participants) may be prompted with a survey of places they would like to eat. The list of available restaurants may be based on vendor information and route information, such that the list includes restaurants that are along the route within some predetermined tolerance (e.g., within 5 miles). The survey may ask the user to select one of the available choices, or to rank the choices as shown in FIG. 5B. Using the results of surveying multiple participants, the caravan management system may determine whether to modify the route, and if so, may generate a new route and distribute the route to each of the participating computing devices.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system, comprising:
    a first computing device in a first vehicle;
    a second computing device in a second vehicle, the second computing device configured to communicate with the first computing device;
    a third computing device in a third vehicle, the third computing device configured to communicate with the first computing device and the second computing device, wherein at least two of the first computing device, the second computing device, and the third computing device, includes a global positioning system (GPS) receiver for collecting GPS coordinates of the first vehicle, the second vehicle, and the third vehicle, respectively; and
    a fourth computing device configured to:
        receive, from the first computing device via a wireless communication network, first information regarding a first driver of the first vehicle;
        receive, from the second computing device via the wireless communication network, second information regarding a second driver of the second vehicle;
        receive, from the third computing device via the wireless communication network, third information regarding a third driver of the third vehicle, wherein the third information comprises past driving behavior data indicating a past driving behavior of the third driver;
        store, in memory, group information that associates the first vehicle, the second vehicle, and the third vehicle with a caravan;
        determine, based at least on the first information, the second information, and the third information that comprises the past driving behavior data indicating the past driving behavior of the third driver, a recommended order of all vehicles in the caravan by applying a rule that prevents the recommended order from placing a driver, who is more likely than other drivers in the caravan to drive through a red traffic light, at a rear of the caravan, wherein the recommended order recommends that the third vehicle be positioned between the first vehicle and the second vehicle in the caravan because the past driving behavior of the third driver indicates that the third driver is more likely than other drivers in the caravan to drive through a red traffic light;
        transmit, via the wireless communication network, the recommended order to at least one of the first computing device, the second computing device, or the third computing device; and
        monitor, at a time during a trip and based at least on GPS coordinates received from the first computing device, the second computing device, or the third computing device, an order of the caravan.

2. The system of claim 1, wherein the fourth computing device is further configured to:
  generate a route for the caravan based at least on a driving score for each of the first driver, the second driver, and the third driver; and
  determine the recommended order further based on the generated route.

3. The system of claim 1, wherein the fourth computing device is further configured to determine the recommended order based on an insurance rate of each of the first driver, the second driver, and the third driver.

4. The system of claim 1, wherein determining the recommended order comprises determining the recommended order based on past driving behavior data for each of the first driver and the second driver.

5. The system of claim 1, wherein the fourth computing device is further configured to determine the recommended order further based on at least one property of each of the first vehicle, the second vehicle, and the third vehicle.

6. The system of claim 1, wherein the fourth computing device is further configured to determine the recommended order further based on a stopping distance of each of the first vehicle, the second vehicle, and the third vehicle.

7. The system of claim 1, wherein the fourth computing device is further configured to generate a route for the caravan based on a first insurance rate associated with the first driver, a second insurance rate associated with the second driver, and a third insurance rate associated with the third driver.

8. The system of claim 1, wherein the fourth computing device is further configured to:
  generate, for the caravan, a first candidate route to a destination, wherein the first candidate route is associated with a first safety rating;
  generate, for the caravan, a second candidate route to the destination, wherein the second candidate route is associated with a second safety rating and wherein the second candidate route is estimated to take longer to travel than the first candidate route;
  select, based on a first insurance rate associated with the first driver, a second insurance rate associated with the second driver, a third insurance rate associated with the third driver, the first safety rating, and the second safety rating, the second candidate route over the first candidate route even though the second candidate route is estimated to take longer to travel than the first candidate route; and
  transmit, via the wireless communication network, the selected second candidate route to at least one of the first computing device, the second computing device, or the third computing device.

9. The system of claim 1,
  wherein the fourth computing device is further configured to generate a route for the caravan, and
  wherein the fourth computing device is further configured to determine the recommended order based on a familiarity with the route of at least one of the first driver, the second driver, or the third driver.

10. The system of claim 1, wherein the fourth computing device is further configured to:
  transmit, to the first computing device, the second computing device, and the third computing device, information regarding the first driver, the second driver, and the third driver to poll the first computing device, the second computing device, and the third computing device; and
  receive one or more votes from the first computing device, the second computing device, or the third computing device,
  wherein the recommended order is further determined based on the one or more votes.

11. The system of claim 1, wherein the fourth computing device is further configured to:
  transmit, to the first computing device, the second computing device, and the third computing device, insurance rates associated with the first driver, the second driver, and the third driver; and
  receive, from the first computing device, the second computing device, or the third computing device, one or more votes for a leader of the caravan,
  wherein the recommended order is further determined based on the one or more votes.

12. The system of claim 1, wherein the fourth computing device is further configured to:
  receive vehicle information regarding at least one of the first vehicle, the second vehicle, or the third vehicle;
  determine, based on the vehicle information, whether to modify a route for the caravan;
  in response to a determination to modify the route, modify the route to obtain a modified route; and
  transmit, via the wireless communication network, the modified route to the first computing device, the second computing device, and the third computing device.

13. The system of claim 12, wherein the vehicle information comprises first information indicating a potential problem with at least one of the first vehicle, the second vehicle, or the third vehicle or comprises second information indicating that at least one of the first vehicle, the second vehicle, or the third vehicle needs fuel to complete the route.

14. The system of claim 1,
  wherein the first computing device comprises a speaker and is configured to receive, through the speaker from the first driver, voice data and to convert the voice data to user information regarding at least one participant of the caravan, and
  wherein the fourth computing device is further configured to:
  receive, from the first computing device, the user information;
  determine, based on the user information, whether to modify a route for the caravan;
  in response to a determination to modify the route, modify the route to obtain a modified route; and
  transmit, via the wireless communication network, the modified route to the first computing device, the second computing device, and the third computing device.

15. The system of claim 14, wherein the user information comprises first information indicating that a participant of the caravan wants to stop to eat or comprises second information indicating that a participant of the caravan wants to stop to use a bathroom.

16. A computing device, comprising:
  a network interface configured to communicate with a first device in a first vehicle, a second device in a second vehicle, and a third device in a third vehicle;
  a memory; and
  a processor configured to:
    receive, via the network interface and from the first device, first information regarding a first driver of the first vehicle and first GPS coordinates collected from a first GPS receiver of the first device;

receive, via the network interface and from the second device, second information regarding a second driver of the second vehicle and second GPS coordinates collected from a second GPS receiver of the second device;

receive, via the network interface and from the third device, third information regarding a third driver of the third vehicle, wherein the third information comprises past driving behavior data indicating a past driving behavior of the third driver and third GPS coordinates collected from a third GPS receiver of the third device;

associate the first vehicle, the second vehicle, and the third vehicle with a caravan;

determine, based at least on the first information, the second information, and the third information that comprises the past driving behavior data indicating the past driving behavior of the third driver, a recommended order of all vehicles in the caravan by applying a rule that prevents the recommended order from placing a driver, who is more likely than other drivers in the caravan to drive through a red traffic light, at a rear of the caravan, wherein the recommended order recommends that the third vehicle be positioned between the first vehicle and the second vehicle in the caravan because the past driving behavior of the third driver indicates that the third driver is more likely than other drivers in the caravan to drive through a red traffic light;

transmit, via the network interface and over a wireless communication network, the recommended order to at least one of the first device, the second device, or the third device; and monitor, at a time during a trip and based at least on the first GPS coordinates, the second GPS coordinates, or the third GPS coordinates, an order of the caravan.

17. The computing device of claim 16, wherein the processor is further configured to:

generate a first route and a second route;

receive a selection of one of the first route and the second route; and determine the recommended order further based on the selection.

18. A method, comprising:

receiving, by a server via a wireless communication network from a first device in a first vehicle, first information regarding a first driver of the first vehicle;

receiving, by the server via the wireless communication network from a second device in a second vehicle, second information regarding a second driver of the second vehicle;

receiving, by the server via the wireless communication network from a third device in a third vehicle, third information regarding a third driver of the third vehicle, wherein the third information comprises past driving behavior data indicating a past driving behavior of the third driver;

associating the first vehicle, the second vehicle, and the third vehicle with a caravan;

determining, based at least on the first information, the second information, and the third information that comprises the past driving behavior data indicating the past driving behavior of the third driver, a recommended order of all vehicles in the caravan by applying a rule that prevents the recommended order from placing a driver, who is more likely than other drivers in the caravan to drive through a red traffic light, at a rear of the caravan, wherein the recommended order recommends that the third vehicle be positioned between the first vehicle and the second vehicle in the caravan because the past driving behavior of the third driver indicates that the third driver is more likely than other drivers in the caravan to drive through a red traffic light;

transmitting, via the wireless communication network, the recommended order to at least one of the first device, the second device, or the third device; and monitoring, at a time during a trip and based at least on first GPS coordinates collected from a first GPS receiver of the first device, second GPS coordinates collected from a second GPS receiver of the second device, or third GPS coordinates collected from a third GPS receiver of the third device, an order of the caravan.

19. The method of claim 18, wherein the determining the recommended order comprises determining the recommended order based on past driving behavior data for each of the first driver and the second driver, and wherein the transmitting the recommended order comprises transmitting, to the first device, the second device, and the third device, a message that recommends that the first vehicle go ahead of the second vehicle and the third vehicle because the past driving behavior data for the first driver indicates that the first driver is a safer driver than the second driver and third driver.

* * * * *